(12) United States Patent
Caballero

(10) Patent No.: US 6,193,450 B1
(45) Date of Patent: Feb. 27, 2001

(54) INTERRUPTED CUT PACIFIER (ICP)

(76) Inventor: Humberto M. Caballero, 10323 Emnora, Houston, TX (US) 77043

( * ) Notice: Subject to any disclaimer, the term of this patent is extended or adjusted under 35 U.S.C. 154(b) by 0 days.

(21) Appl. No.: 08/931,025

(22) Filed: Sep. 15, 1997

(51) Int. Cl.[7] ................................................. B23C 1/06
(52) U.S. Cl. ................................. 409/231; 409/134
(58) Field of Search ................... 409/5, 231, 232, 409/233, 234, 134, 141

(56) References Cited

U.S. PATENT DOCUMENTS

| | | | | |
|---|---|---|---|---|
| 3,750,295 | * | 8/1973 | Nordmann et al. | 33/548 |
| 3,808,790 | * | 5/1974 | Preston et al. | 57/88 |
| 3,913,192 | * | 10/1975 | Baumer et al. | 409/231 |
| 4,292,114 | * | 9/1981 | Engmann et al. | 156/447 |
| 4,324,094 | * | 4/1982 | Cicerone | 57/267 |
| 4,402,388 | * | 9/1983 | Wosegien et al. | 188/56 |
| 4,445,320 | * | 5/1984 | Oppl et al. | 57/88 |
| 5,060,882 | * | 10/1991 | Rousculp et al. | 242/441.3 |
| 5,237,900 | * | 8/1993 | Supe-Dienes et al. | 83/563 |
| 5,335,922 | * | 8/1994 | Unate | 409/234 |
| 5,545,078 | * | 8/1996 | Schulz et al. | 451/352 |
| 6,016,716 | * | 1/2000 | Mauro | 74/409 |

\* cited by examiner

Primary Examiner—Daniel W. Howell

(57) ABSTRACT

An interrupted cut pacifier (ICP) for machine tool spindle drive gears. This device forces constant engagement of the spindle drive gears during interrupted cut operations immediately causing the gears to stop banging into one another. Activation of the device causes contact shoes to grip the rotating machine spindle. Machine wear is minimized and production is increased.

7 Claims, 1 Drawing Sheet

SECTION A-A

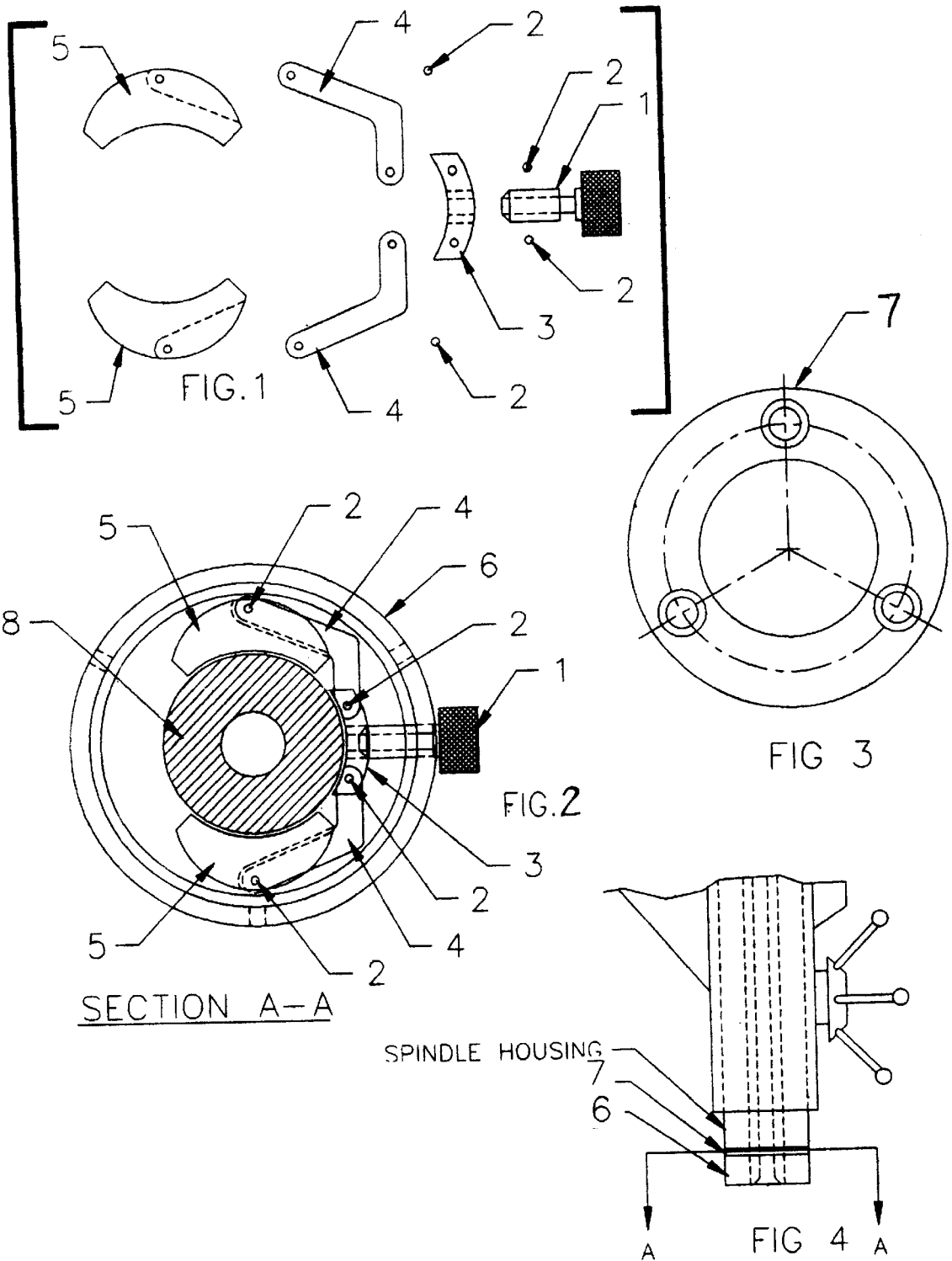

INTERRUPTED CUT PACIFIER (ICP)

BACKGROUND OF THE INVENTION

Every machine tool with a gear driven spindle must have a small amount of clearance between adjacent gears. Whenever machining an irregularly shaped workpiece or using a multi-inserted milling cutter, the otherwise constant force of the gear driven spindle is interruped as the cutting tool travels in and out of the workpiece. When the cutting tool moves out of the workpiece the clearance between the gears causes them to momentarily disengage only to violently re-engage with the impact of the cutting tool upon the workpiece. This repetitive banging has varying detrimental results; 1) Production is less because the speed and feed rates must be slowed down 2) Cutting tool expense is higher because of impact induced tool failure 3) Machine parts must be replaced more frequently because of impact forces and 4) Operator is at a higher safety risk. Interrupted cuts have been a generally accepted necessary evil since the invention of machine tools There is, to my knowledge, no previous or existing remedy to this problem, other than this invention.

BRIEF SUMMARY OF THE INVENTION

The Interrupted Cut Pacifier (ICP) is a remarkably simple invention that maintains constant engagement of the machine spindle gears by applying external force to the rotating spindle. All of the detrimental conditions described above simply go away. In fact, speeds and feeds may be increased.

An adapter plate is mounted to the machine spindle housing. The ICP is then attached to the adapter plate. When machining an interrupted cut, the operator activates the device to immediately stop the impact induced banging of the spindle gears.

BRIEF DESCRIPTION OF THE SEVERAL VIEWS OF THE DRAWING

FIG. 1 is an exploded view of the ICP internal components

FIG. 2 is a top perspective view of the installed and ready for use ICP device housing FIG. 3 is a drawing of the upper plate which mounts to the machine spindle housing FIG. 4 is a side perspective view of the ICP installed on a milling machine

DETAILED DESCRIPTION OF THE INVENTION

Referring to FIG. 3, the upper plate (7) is installed upon the machine spindle housing. Referring to FIG. 2, the ICP device housing (6) is attached to the upper plate (7), around the machine spindle (8). As thumbscrew (1) is tightened the arm bracket (3) moves away from the spindle (8). This causes two identical contact arms (4) to pivot on the arm bracket roll pins (2) and make contact with the inside diameter of the device housing (6). Attached to the contact arms (4) are two identical contact shoes (5) which are made from a wear resistant, friction reducing composite. Because of the force of the contact arms (4) on the inside diameter of the device housing (6), the contact shoes (5) engage the spindle (8) causing forced and constant contact between shoes and spindle until the pressure is released by the operator by loosening the thumbscrew (1). It is this "forced and constant contact" which keeps adjacent spindle drive gears from banging into each other during interupted cut applications. The invention is defined in the following claims.

I claim:

1. A stabilizing device for a machine spindle comprising:

a pair of opposed shoes on opposed sides of said spindle having inner arcuate surfaces for contacting said spindle;

a pair of arms pivotally connected at one end to said shoes;

a bracket pivotally connected to the other end of each of said arms; and adjustable mounting means mounting said bracket for movement toward and away from said spindle, said mounting means applying force to said arms and shoes when moved in one direction to move said shoes into contact with said spindle and stabilize said spindle.

2. A stabilizing device for a machine spindle as set forth in claim 1, wherein an adjustable screw is operatively connected to said adjustable mounting means for moving said bracket toward and away from said spindle.

3. A stabilizing device for a machine spindle as set forth in claim 1, wherein an annular plate is positioned about said spindle, said shoes being supported on said plate for movement toward and away from said spindle.

4. A stabilizing device for a machine spindle as set forth in claim 3, wherein said arms are bent at an acute angle for applying force to said shoes when said bracket is moved away from said spindle.

5. A stabilizing device for a machine spindle as set forth in claim 4, wherein said bracket has opposed sides and said arms are pivotally connected to said opposed sides for actuation of said arms upon movement of said bracket toward and away from said spindle.

6. A stabilizing device for a machine spindle as set forth in claim 1, wherein an adjustable thumb screw is operatively connected to said bracket for manual actuation to move said bracket and arms toward and away from said spindle.

7. A stabilizing device for a machine spindle as set forth in claim 3, wherein an annular housing is positioned about said spindle and includes an upper supporting shoulder, said plate being mounted on said housing on said shoulder and being supported thereby.

* * * * *